United States Patent
Kenney et al.

(10) Patent No.: US 12,461,876 B2
(45) Date of Patent: Nov. 4, 2025

(54) SYSTEMS AND METHODS FOR PROVIDING A GLOBAL NAVIGATION SATELLITE SYSTEM CAPABILITY TO A TIME SENSITIVE NETWORK DEVICE

(71) Applicant: Juniper Networks, Inc., Sunnyvale, CA (US)

(72) Inventors: John B. Kenney, Groton, MA (US); Kamatchi S. Gopalakrishnan, Dublin, CA (US); Jack W. Kohn, Mountain View, CA (US); Sushma B. Bavache, Bangalore (IN); Amit Verma, Bangalore (IN); Rafik P., Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 48 days.

(21) Appl. No.: 18/478,152

(22) Filed: Sep. 29, 2023

(65) Prior Publication Data

US 2024/0028541 A1     Jan. 25, 2024

Related U.S. Application Data

(63) Continuation of application No. 17/662,773, filed on May 10, 2022, now Pat. No. 11,816,051.

(51) Int. Cl.
    *G06F 13/38*        (2006.01)
    *G04R 20/04*       (2013.01)
    *G06F 13/42*        (2006.01)

(52) U.S. Cl.
    CPC ........... *G06F 13/382* (2013.01); *G04R 20/04* (2013.01); *G06F 13/4282* (2013.01); *G06F 2213/0042* (2013.01)

(58) Field of Classification Search
    CPC ..................................................... G06N 20/00
    See application file for complete search history.

(56) References Cited

U.S. PATENT DOCUMENTS 7,808,428 B2 * 10/2010 Whitehead .............. G01S 19/35
                                               342/357.21
8,031,747 B2    10/2011 Barry et al.
(Continued)

FOREIGN PATENT DOCUMENTS

JP        2011155360 A     8/2011

OTHER PUBLICATIONS

U.S. Appl. No. 17/662,773, inventors Kenney; John B et al., filed May 10, 2022.
(Continued)

*Primary Examiner* — Henry Tsai
*Assistant Examiner* — Juanito C Borromeo
(74) *Attorney, Agent, or Firm* — Harrity & Harrity, LLP

(57) ABSTRACT

In some implementations, a device may receive, via a universal serial bus (USB) interface, configuration information and a supply of power from a network device. The device may receive, via an antenna that is external to the device, a first signal indicating timing information. The device may generate, based on the first signal, a second signal and a third signal, wherein the second signal comprises a one pulse per second signal and the third signal comprises a ten-megahertz signal. The device may provide, to the network device, the second signal and the third signal. The device may receive, via an input port, a clock signal to provide an extended holdover functionality to the network device.

20 Claims, 4 Drawing Sheets

(56) References Cited

U.S. PATENT DOCUMENTS

| | | | |
|---|---|---|---|
| 8,661,268 B2* | 2/2014 | Brooks | G06F 1/266 |
| | | | 713/340 |
| 9,116,234 B2* | 8/2015 | Van Dierendonck | H04B 1/707 |
| 10,122,487 B2 | 11/2018 | Whitehead et al. | |
| 10,594,017 B2* | 3/2020 | Waelde | G01S 13/34 |
| 2007/0116061 A1 | 5/2007 | Meagher et al. | |
| 2014/0085141 A1 | 3/2014 | Geva et al. | |
| 2016/0211937 A1 | 7/2016 | Barry et al. | |
| 2016/0306048 A1 | 10/2016 | Dunn et al. | |
| 2020/0120408 A1 | 4/2020 | Boyd et al. | |
| 2020/0383072 A1 | 12/2020 | Chauhan et al. | |
| 2021/0266086 A1 | 8/2021 | Liu et al. | |

OTHER PUBLICATIONS

Extended European Search Report for Application No. EP22181342.1, mailed on Jan. 4, 2023, 10 pages.

* cited by examiner

SYSTEMS AND METHODS FOR PROVIDING A GLOBAL NAVIGATION SATELLITE SYSTEM CAPABILITY TO A TIME SENSITIVE NETWORK DEVICE

RELATED APPLICATION

This application is a continuation of U.S. patent application Ser. No. 17/662,773, filed May 10, 2022, which is incorporated herein by reference in its entirety.

BACKGROUND

Global navigation satellite system (GNSS) is a term for a satellite navigation system that provides autonomous geospatial positioning with global coverage. The most ubiquitous of these technologies is the global positioning system (GPS).

SUMMARY

In some implementations, a method includes receiving, by a device and via a universal serial bus (USB) interface, configuration information and a supply of power from a network device; receiving, by the device and via an antenna that is external to the device, a first signal indicating timing information; generating, by the device and based on the first signal, a second signal and a third signal, wherein the second signal comprises a one pulse per second signal and the third signal comprises a ten-megahertz signal; providing, by the device and to the network device, the second signal and the third signal; and receiving, by the device, a fourth signal, wherein the fourth signal comprises a clock signal that enables the device to provide an extended holdover functionality to the network device. In some implementations, the method may include determining that a parameter of the first signal satisfies a threshold; and terminating the providing of the second signal and the third signal based on the parameter of the first signal satisfying the threshold. In some implementations, the method may further include generating another second signal and another third signal based on the fourth signal; and providing the other second signal and the other third signal to the network device.

In some implementations, a device includes a USB interface configured to receive configuration information and a supply of power from a network device; a first interface configured to output a first signal, wherein the first signal comprises a one pulse per second signal; a second interface configured to output a second signal to the network device, wherein the second signal comprises a first ten-megahertz signal; a third interface configured to receive a third signal, wherein the third signal comprises a clock signal that enables the device to provide an extended holdover functionality to the network device; one or more memories; and one or more processors to: receive, via an external antenna, a fourth signal indicating timing information; generate, based on the timing information, the first signal and the second signal; and output the first signal and the second signal to the network device, wherein the first signal is output via the first interface and the second signal is output via the second interface.

In some implementations, a system includes an antenna configured to receive a global navigation satellite system (GNSS) signal; and a GNSS receiver configured to: receive, via a universal serial bus (USB) interface, configuration information and a supply of power from a network device; receive, via the antenna, the GNSS signal; generate, based on the GNSS signal, a first signal and a second signal, wherein the first signal comprises a one pulse per second signal and the second signal comprises a ten-megahertz signal; provide, to the network device, the first signal and second signal; and receive, via an input port, a third signal, wherein the third signal comprises a clock signal that enables the GNSS receiver to provide an extended holdover functionality to the network device.

DETAILED DESCRIPTION

Figure 1:
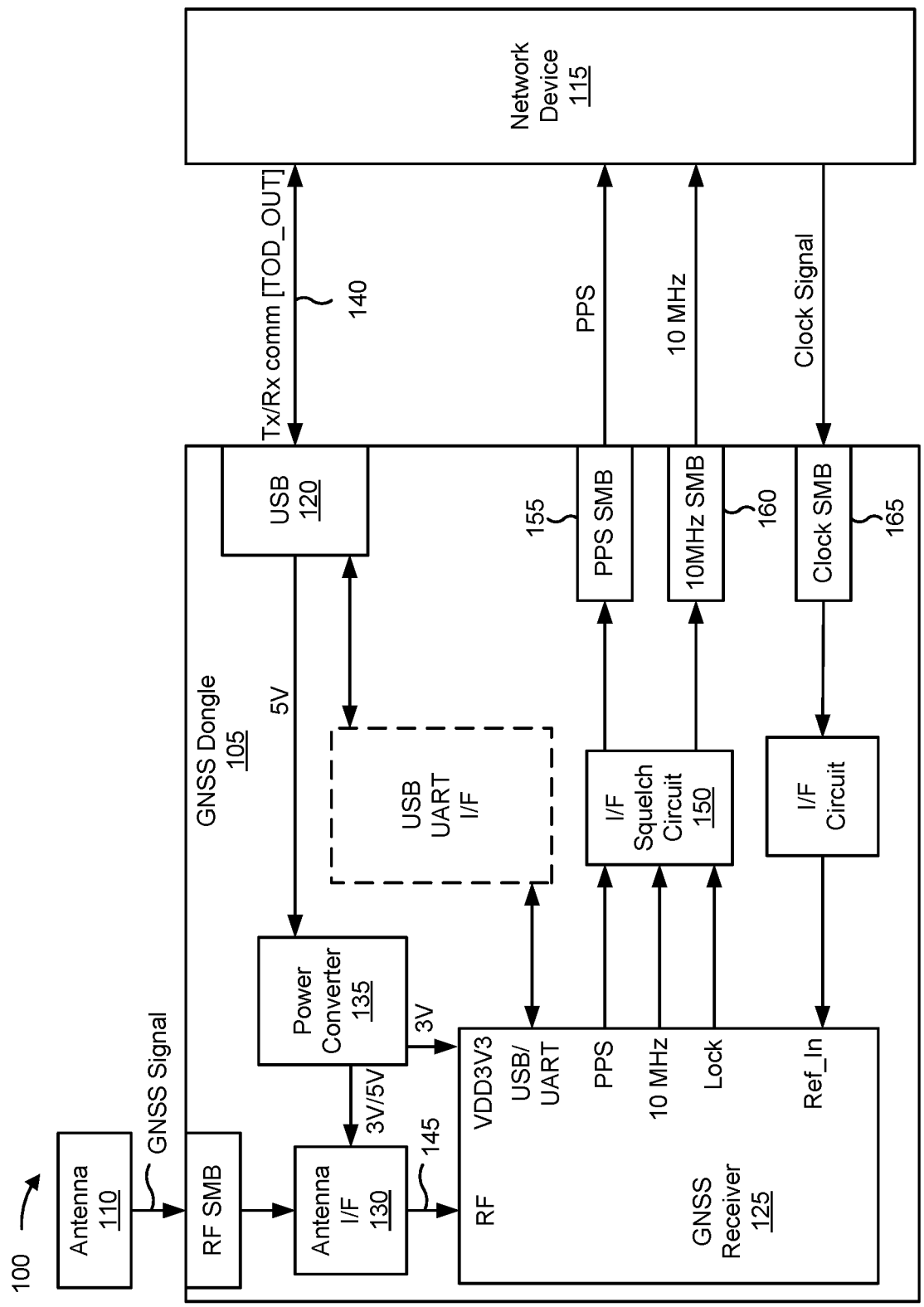
FIG. 1 is a diagram of an example implementation described herein.

The following detailed description of example implementations refers to the accompanying drawings. The same reference numbers in different drawings may identify the same or similar elements.

An IEEE 1588-2008 Precision Timing Protocol (PTP) device (e.g., a network device such as a router or a server device, among other examples) may be configured to operate in various roles when deployed in a network that supports precise delivery of time, phase, and frequency. For example, a PTP device may be deployed as a master clock that provides data indicating a time, phase, and/or frequency to one or more other devices included in the network.

When a PTP device works as a master clock, the PTP device may source time from a time source. For example, the PTP device may source time from a global navigation satellite system (GNSS) system (e.g., a global positioning system (GPS), Galileo, or GLONASS). A PTP device that sources time from a GNSS system may be referred to as a PTP GNSS grandmaster device.

To source time and/or position from a GNSS system, a PTP GNSS grandmaster device may be associated with a GNSS antenna, a GNSS receiver, and a networking device. The GNSS antenna may be configured to receive (and amplify) radio signals transmitted by orbiting GNSS satellites. The GNSS receiver may be configured to connect to the GNSS antenna and may process the received radio signals to determine a position, time, and/or velocity associated with the PTP GNSS grandmaster device and/or the networking device. The GNSS antenna may provide data indicating the position, time, and/or velocity of the PTP GNSS grandmaster device to the networking device via an interface.

In some cases, the GNSS receiver may be configured to provide the frequency and phase aligned to the GNSS time. The GNSS receiver may provide the frequency and phase over the same, or different, interface over which the position, time, and/or velocity is provided to the networking device.

The networking device may receive the data indicating the time, phase, and/or frequency from the GNSS receiver. The networking device may utilize the time, phase, and/or frequency to align a local clock to time, phase, and/or frequency of the GNSS. The networking device may utilize the aligned local clock to provide data indicating a time, phase, and/or frequency to one or more other devices included in a network associated with the networking device.

For precise timing applications, the GNSS antenna is typically located separate from a network device that is configured as the PTP GNSS grandmaster device. For example, the network device may be installed within a server rack in a facility of a service provider and the GNSS antenna may be positioned outside of the facility (e.g., at a static location having sufficient visibility of the GNSS satellites to enable the GNSS antenna to receive the radio signals from the GNSS satellites).

In some cases, the GNSS receiver and/or the networking device may be external to the network device. For example, the GNSS receiver and/or the networking device may be included in a small form-factor pluggable (SFP)-based GNSS receiver. The SFP-based GNSS receiver may be connected to the network device via a port of the network device.

While the SFP-based GNSS receiver may be able to provide PTP functionality to any device that supports SFPs being added to a system, the SFP-based GNSS receiver may lack a standard interface for configuration and monitoring. Thus, configuration, management, and monitoring of the SFP-based GNSS receiver by the device to which the SFP-based GNSS receiver is connected must be performed out of band of the software (e.g., operating system) of the device. Performing the configuration, management, and monitoring of the SFP-based GNSS receiver out of band of the software of the device may increase the difficulty of trouble-shooting issues associated with the SFP-based GNSS receiver.

Further, the SFP-based GNSS receiver requires the use of a network port of the device to which it is connected (e.g., an Ethernet port), which reduces the quantity of network ports available on the device. In some cases, the network ports available on the device may not support the network port speeds compatible with the SFP-based GNSS receiver.

Additionally, the SFP-based GNSS receiver also adds one additional hop in the delivery of the timing information. This additional hop reduces the error budget associated with the delivery of the timing information by one hop.

In some cases, the networking device may be integrated with the device to which the GNSS receiver is connected and the GNSS receiver may connect to the device via a universal serial bus (USB) port of the device. However, the GNSS receiver may not have a one pulse per second (PPS) output that can be used by the device to align phase, a 10 MHz output for providing a fast lock, and/or an input for receiving a clock signal (e.g., a 10 MHz signal) that can be used to provide extended holdover (e.g., providing timing information based on the clock signal when a quality of the signal received via the GNSS antenna degrades to below a threshold) and/or enhanced primary reference time clock (ePRTC) support.

Some implementations described herein relate to a USB-based GNSS receiver. The GNSS receiver may be configured to receive a GNSS signal via an associated antenna and to generate a one PPS signal and a 10 MHz signal based on the GNSS signal. In this way, the GNSS receiver may provide high precision timing information and a fast lock capability to a connected network device. Further, the GNSS receiver may be configured to communicate configuration and monitoring data via the USB interface, thereby enabling integrated configuration, management, and monitoring functions on the connected network device. In some implementations, the GNSS receiver may be configured to receive a clock signal via an input port. The GNSS receiver may be configured to provide an extended holdover and/or ePRTC support based on the input clock signal.

FIG. 1 is a diagram of an example implementation 100 associated with providing a GNSS capability to a time sensitive network device. As shown in FIG. 1, example implementation 100 includes a GNSS dongle 105, an antenna 110, and a network device 115. These devices are described in more detail elsewhere herein and in connection with FIG. 2.

The antenna 110 may include one or more devices configured to receive and/or amplify radio signals transmitted by orbiting GNSS satellites. The radio signals may include data indicating the position, time, and/or velocity that can be used to determine location information (e.g., position, velocity, direction of movement, and/or the like) associated with the network device 115. The antenna 110 may connect to the GNSS dongle 105 and/or provide the radio signals to the GNSS dongle 105 via an antenna interface 130.

The network device 115 may include one or more devices capable of receiving, processing, storing, routing, and/or providing traffic (e.g., a packet and/or other information or metadata) in a manner described herein. For example, the network device 115 may include a router, such as a label switching router (LSR), a label edge router (LER), an ingress router, an egress router, a provider router (e.g., a provider edge router or a provider core router), a virtual router, or another type of router. Additionally, or alternatively, the network device 115 may include a gateway, a switch, a firewall, a hub, a bridge, a reverse proxy, a server (e.g., a proxy server, a cloud server, or a data center server), a load balancer, and/or a similar device. In some implementations, the network device 115 may be a physical device implemented within a housing, such as a chassis. In some implementations, the network device 115 may be a virtual device implemented by one or more computing devices of a cloud computing environment or a data center. In some implementations, a group of network devices 115 may be a group of data center nodes that are used to route traffic flow through a network.

In some implementations, the network device 115 may comprise an IEEE 1588-2008 PTP device that is deployed in a network that supports precise delivery of time, phase, and frequency. In some implementations, the network device 115 may be deployed as a master clock that provides data indicating a time, phase, and/or frequency to one or more other devices included in the network (e.g., the network device 115 may be deployed as a PTP GNSS grandmaster device). The network device 115 may provide the data indicating the time, phase, and/or frequency based on one or more signals provided by the GNSS dongle 105, as described in greater detail below.

The GNSS dongle 105 may include a USB-based GNSS receiver. The GNSS dongle 105 may be configured to connect to the antenna 110 via an antenna port of the GNSS dongle 105. The antenna port may be associated with an antenna interface 130 that communicates the radio signals received by the antenna 110 to the GNSS receiver 125. The GNSS receiver 125 may process the radio signals to determine a position, time, and/or velocity associated with the network device 115, as described in greater detail below.

The GNSS dongle 105 may include a USB port 120 that is configured to connect to the network device 115 via a USB port of the network device 115. As shown by reference number 140, the USB port 120 may be configured to communicate data between the GNSS dongle 105 and the network device 115. In some implementations, the USB port 120 may be associated with a USB or a universal asynchronous receiver-transmitter (UART) interface (shown using dashed lines in FIG. 1) that enables data to be communicated via a GNSS receiver 125 and the USB port 120. In some implementations, the data may be communicated directly between the GNSS receiver 125 and the USB port 120. As used herein, unless otherwise specified, the terms "USB port" and "USB interface" may be used interchangeably to refer to a USB port, a USB interface, a UART interface, and/or a combination of two or more of a USB port, a USB interface, or a UART interface.

In some implementations, the GNSS receiver 125 may receive configuration information from the network device 115 via the USB port 120. The configuration information may indicate a length of a cable connecting the GNSS dongle 105 and the network device 115, a length of a cable connecting the GNSS dongle 105 and the antenna 110, whether a clock signal is available via an input port of the GNSS dongle 105 (described in greater detail below), and/or data associated with upgrading and/or modifying a firmware of the GNSS receiver 130, among other examples.

In some implementations, the GNSS receiver 125 may provide monitoring information to the network device 115 via the USB port 120. In some implementations, the monitoring information may include status information. The status information may enable the network device 115 to perform one or more monitoring operations. For example, the status information may indicate a status of the GNSS dongle 105, the GNSS receiver 130, the antenna 110, and/or the GNSS satellites from which the GNSS signal is received by the antenna 110.

In some implementations, the monitoring information may include time of day (TOD) data. The TOD data may indicate a quality of the timing information and/or a quality of the GNSS signal received by the GNSS receiver 125. In some implementations, the GNSS receiver 125 may periodically (e.g., every one second) provide the TOD data to the network device 115.

In some implementations, the USB port 120 may be configured to communicate a supply of power to the GNSS dongle 105. For example, as shown in FIG. 1, the USB port 120 may be configured to communicate power supplied by the network device 115 to the GNSS receiver 125 and/or an antenna interface 130 via a power converter 135. In this way, the GNSS dongle 105 and/or the GNSS receiver 125 may operate based on power supplied by the network device 115. By utilizing power supplied by the network device 115, a complexity of the GNSS dongle 105 may be reduced relative to a GNSS receiver that utilizes power supply by a device other than the device to which the GNSS receiver is connected.

As shown by reference number 145, the GNSS receiver 125 may receive a GNSS signal from the antenna 110 via an antenna interface 130. The GNSS receiver 125 may process the radio signals to generate one or more output signals that can be used to determine timing information (e.g., information indicating a position, a time, and/or a velocity) associated with the network device 115. In some implementations, the GNSS receiver 125 may determine a delay (e.g., an amount of time for the GNSS signal to travel between the GNSS satellites and the GNSS receiver 130) associated with the GNSS signal based on configuration information received from the network device 115.

For example, the configuration information may indicate a length of the cable connecting the GNSS dongle 105 to the network device 115 and a length of a cable connecting the GNSS dongle 105 to the antenna 110. The GNSS receiver 125 may determine a first amount of time for the GNSS signal to travel between the antenna 110 and the GNSS dongle 105 based on the length of the cable connecting the GNSS dongle 105 and the antenna 110. The GNSS receiver 125 may determine a second amount of time for timing information to be provided to the network device 115 based on the length of the cable connecting the GNSS dongle 105 and the network device 115. The GNSS receiver 130 may determine the delay associated with the GNSS signal based on the first amount of time and the second amount of time.

The GNSS receiver 125 may generate one or more outputs based on processing the GNSS signal. The one or more outputs may be provided to the network device 115 to enable the network device 115 to perform one or more functions of a PTP grandmaster device. In some implementations, the GNSS dongle 105 may include a set of electrical connections that are configured to provide the one or more outputs to, and/or receive one or more inputs from, a corresponding set of electrical connections of the network device 115. In some implementations, one or more of the set of electrical connections may comprise an unbalanced electrical interface.

For example, as shown in FIG. 1, the GNSS dongle 105 may include a first electrical connection corresponding to a first output port (e.g., port 155, as shown in FIG. 1), a second electrical connection corresponding to a second output port (e.g., port 160, as shown in FIG. 1), and a third electrical connection corresponding to an input port (e.g., port 165, as shown in FIG. 1). In some implementations, as described in greater detail below, the first electrical connection may be configured to provide a one pulse per second (PPS) signal to the network device 115, the second electrical connection may be configured to provide a 10 MHz signal to the network device 115, and the third electrical connection may be configured to receive a clock signal from the network device 115.

In some implementations, the one PPS signal may enable the network device 115 to accurately track phase and/or frequency. The one PPS signal may be output by the GNSS receiver 125 to an interface/squelch circuit 150 (described in greater detail below). The interface/squelch circuit 150 may cause the one PPS signal to be provided to the network device 115 via the port 155 (e.g., via the first electrical connection) of the GNSS dongle 105. The port 155 may be configured to output signals to the network device 115 via a corresponding port (e.g., PPS Deutsches Institut für Normung (DIN)).

In some implementations, the 10 MHz signal may be provided to the network device 115 to enable the network device 115 to accurately track phase and/or frequency and/or to provide the network device 115 with a fast lock capability. The fast lock capability may enable the network device 115 to quickly determine that a quality of the GNSS signal and/or an accuracy of the timing information satisfies (e.g., is less than) a threshold and/or to perform a holdover procedure, as described in greater detail below. The 10 MHz signal may be output by the GNSS receiver 125 to the interface/squelch circuit 150. The interface/squelch circuit 150 may cause the 10 MHz signal to be provided to the network device 115 via a port 160 of the GNSS dongle 105. The port 160 may be configured to output signals to the network device 115 via a corresponding port (e.g., 10 MHz DIN).

In some implementations, the one or more outputs generated by the GNSS receiver 125 may include a lock signal. The GNSS receiver 125 may output the lock signal to the interface/squelch circuit 150 to prevent the one PPS signal and/or the 10 MHz signal being provided to the network device 115.

In some implementations, the GNSS receiver 125 may output the lock signal based on one or more parameters of the GNSS signal satisfying one or more thresholds. For example, the GNSS receiver 125 may determine that signal strength of the GNSS signal, a quantity of available GNSS satellites, an amount of noise associated with the GNSS signal, and/or one or more other parameters indicating a quality of the GNSS signal and/or an accuracy of the timing information satisfies (e.g., is less than, is greater than, or crosses over) a threshold. The GNSS receiver 125 may output the lock signal to the interface/squelch circuit 150 based on the quality of the GNSS signal and/or the accuracy of the timing information satisfying the threshold.

In some implementations, the interface/squelch circuit 150 may terminate and/or prevent a transmission of the one PPS signal and/or the 10 MHz signal to the network device 115 based on a state of the lock signal. For example, when the lock signal is high or associated with an active state, the interface/squelch circuit 150 may determine that the quality of the GNSS signal and/or the timing information satisfies a threshold associated with providing the one PPS signal and/or the 10 MHz signal to the network device 115. When the lock signal is low and/or associated with a inactive state, the interface/squelch circuit 150 may determine that the quality of the GNSS signal and/or the timing information satisfies a threshold associated with terminating the one PPS signal and/or the 10 MHz signal and/or preventing the one PPS signal and/or the 10 MHz signal to the network device 115 and may cause the one PPS signal and/or the 10 MHz signal to be driven to ground based on receiving the lock signal from the GNSS receiver 125.

In some implementations, the network device 115 may be configured to perform an extended holdover procedure based on the quality of the GNSS signal and/or the accuracy of the timing information satisfying the threshold. The network device 115 may perform a holdover procedure to generate timing information based on a history of timing information. In some implementations, the holdover procedure may be performed by the network device 115 based on the one PPS signal and/or the 10 MHz signal being driven to ground.

In some implementations, the GNSS receiver 125 may determine that the holdover procedure is to be performed by the network device 115 based on configuration information received from the network device 115. For example, the network device 115 may provide configuration information to the GNSS dongle 105 via the USB port 120 indicating that the network device 115 is to perform the holdover procedure when the quality of the GNSS signal satisfies the threshold and/or cannot be obtained. The GNSS receiver 125 may output the lock signal when the quality of the GNSS signal and/or the accuracy of the timing information satisfies the threshold based on the network device 115 being configured to perform the holdover procedure.

In some implementations, the GNSS dongle 105 (e.g., the GNSS receiver 125) may provide timing information to the network device 115 based on a signal other than the GNSS signal when the quality of the GNSS signal satisfies the threshold and/or cannot be obtained (e.g., a movement of the GNSS satellite causes an object (e.g., a building) to block the GNSS signal from being received by the antenna 110).

In some implementations, the GNSS receiver 125 may provide the timing information based on a clock signal (e.g., a 10 MHz signal) received from the network device 115. The GNSS receiver 125 may receive the clock signal from the network device 115 via the input port 165.

The GNSS receiver 125 may perform an extended holdover operation based on the clock signal received from the network device 115. The GNSS receiver 125 may provide timing information to the network device 115 via the port 155 and/or the port 160. For example, the GNSS receiver 125 may generate, based on the clock signal received from the network device 115, a one PPS signal that is provided to the network device 115 via the port 155 and a 10 MHz signal that is provided via the port 160, in a manner similar to that described above.

In some implementations, the GNSS receiver 125 may output additional information to the network device 115 via the USB port 120. In some implementations, the additional information may include TOD data indicating a quality of the GNSS signal and/or an accuracy of the timing information, whether the quality of the GNSS signal and/or the accuracy of the timing information satisfies the threshold, that a holdover procedure is being performed by the GNSS receiver 130, and/or that the network device 115 is to provide a holdover procedure, among other examples. In some implementations, the GNSS receiver 125 may periodically (e.g., every 0.5 seconds, every one second, or every two seconds, among other examples) provide one or more portions of the additional information to the network device 115 via the USB port 120.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
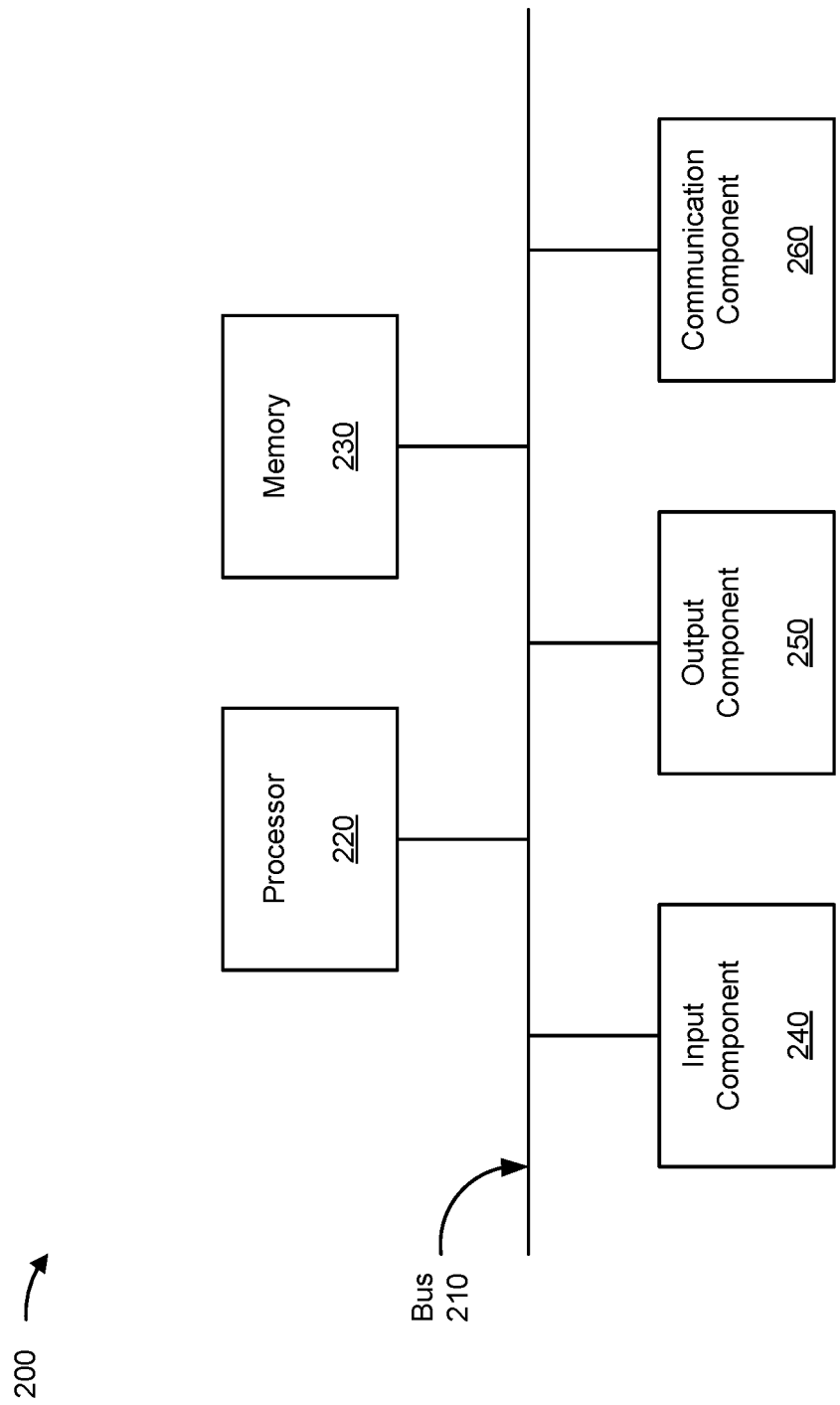
FIG. 2 is a diagram of example components of one or more devices of FIG. 1.

FIG. 2 is a diagram of example components of a device 200, which may correspond to the GNSS dongle 105, the network device 115, and/or the GNSS receiver 125. In some implementations, the GNSS dongle 105, the network device 115, and/or the GNSS receiver 125 include one or more devices 200 and/or one or more components of device 200. As shown in FIG. 2, device 200 may include a bus 210, a processor 220, a memory 230, an input component 240, an output component 250, and a communication component 260.

Bus 210 includes one or more components that enable wired and/or wireless communication among the components of device 200. Bus 210 may couple together two or more components of FIG. 2, such as via operative coupling, communicative coupling, electronic coupling, and/or electric coupling. Processor 220 includes a central processing unit, a graphics processing unit, a microprocessor, a controller, a microcontroller, a digital signal processor, a field-programmable gate array, an application-specific integrated circuit, and/or another type of processing component. Processor 220 is implemented in hardware, firmware, or a combination of hardware and software. In some implementations, processor 220 includes one or more processors capable of being programmed to perform one or more operations or processes described elsewhere herein.

Memory 230 includes volatile and/or nonvolatile memory. For example, memory 230 may include random access memory (RAM), read only memory (ROM), a hard disk drive, and/or another type of memory (e.g., a flash memory, a magnetic memory, and/or an optical memory). Memory 230 may include internal memory (e.g., RAM, ROM, or a hard disk drive) and/or removable memory (e.g., removable via a universal serial bus connection). Memory 230 may be a non-transitory computer-readable medium. Memory 230 stores information, instructions, and/or software (e.g., one or more software applications) related to the operation of device 200. In some implementations, memory 230 includes one or more memories that are coupled to one or more processors (e.g., processor 220), such as via bus 210.

Input component 240 enables device 200 to receive input, such as user input and/or sensed input. For example, input component 240 may include a touch screen, a keyboard, a keypad, a mouse, a button, a microphone, a switch, a sensor, a global positioning system sensor, an accelerometer, a gyroscope, and/or an actuator. Output component 250 enables device 200 to provide output, such as via a display, a speaker, and/or a light-emitting diode. Communication component 260 enables device 200 to communicate with other devices via a wired connection and/or a wireless connection. For example, communication component 260 may include a receiver, a transmitter, a transceiver, a modem, a network interface card, and/or an antenna.

Device 200 may perform one or more operations or processes described herein. For example, a non-transitory computer-readable medium (e.g., memory 230) may store a set of instructions (e.g., one or more instructions or code) for execution by processor 220. Processor 220 may execute the set of instructions to perform one or more operations or processes described herein. In some implementations, execution of the set of instructions, by one or more processors 220, causes the one or more processors 220 and/or the device 200 to perform one or more operations or processes described herein. In some implementations, hardwired circuitry is used instead of or in combination with the instructions to perform one or more operations or processes described herein. Additionally, or alternatively, processor 220 may be configured to perform one or more operations or processes described herein. Thus, implementations described herein are not limited to any specific combination of hardware circuitry and software.

The number and arrangement of components shown in FIG. 2 are provided as an example. Device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
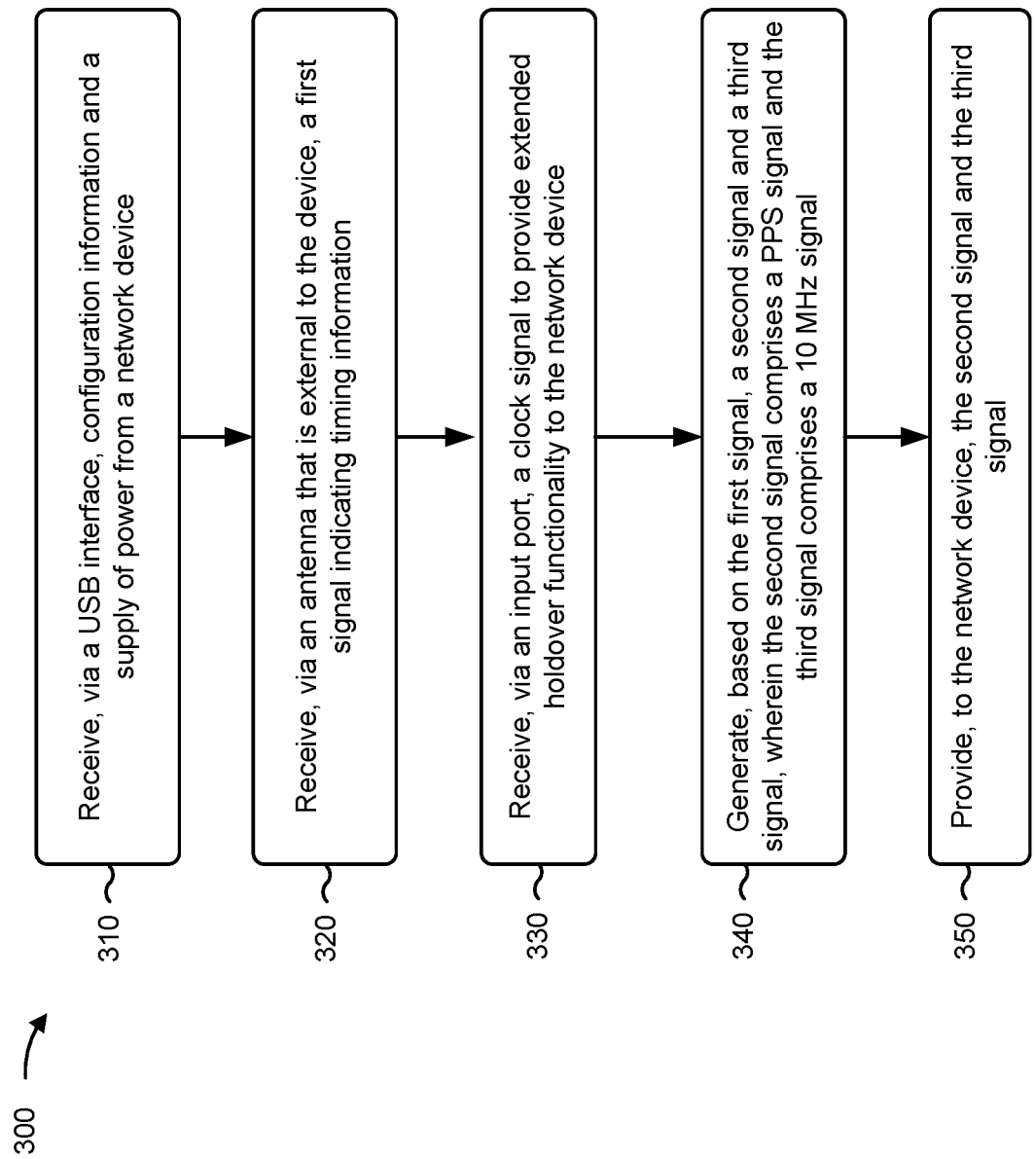
FIGS. 3 and 4 are flowcharts of example processes relating to providing a global navigation satellite system (GNSS) capability to a time sensitive network device.

FIG. 3 is a flowchart of an example process 300 associated with systems and methods for providing a GNSS capability to a time sensitive network device. In some implementations, one or more process blocks of FIG. 3 are performed by a GNSS receiver (e.g., GNSS receiver 130). In some implementations, one or more process blocks of FIG. 3 are performed by another device or a group of devices separate from or including the device, such as a network device (e.g., network device 115). Additionally, or alternatively, one or more process blocks of FIG. 3 may be performed by one or more components of device 200, such as processor 220, memory 230, input component 240, output component 250, and/or communication component 260.

As shown in FIG. 3, process 300 may include receiving, via a USB interface, configuration information and a supply of power from a network device (block 310). For example, the device may receive, via a USB interface, configuration information and a supply of power from a network device, as described above.

As further shown in FIG. 3, process 300 may include receiving, via an antenna that is external to the device, a first signal indicating timing information (block 320). For example, the device may receive, via an antenna that is external to the device, a first signal indicating timing information, as described above.

As further shown in FIG. 3, process 300 may include receiving, via an input port of the device, a clock signal to provide an extended holdover functionality to the network device (block 330). For example, the device may receive, via an input port of the device, a clock signal to provide an extended holdover functionality to the network device.

As further shown in FIG. 3, process 300 may include generating, based on the first signal, a second signal and a third signal, wherein the second signal comprises a one pulse per second signal and the third signal comprises a ten-megahertz signal (block 340). For example, the device may generate, based on the first signal, a second signal and a third signal, wherein the second signal comprises a one pulse per second signal and the third signal comprises a ten-megahertz signal, as described above.

As further shown in FIG. 3, process 300 may include providing, to the network device, the second signal and the third signal (block 350). For example, the device may provide, to the network device, the second signal and the third signal, as described above.

Process 300 may include additional implementations, such as any single implementation or any combination of implementations described below and/or in connection with one or more other processes described elsewhere herein.

In a first implementation, the second signal is provided to the network device via a first interface and the third signal is provided to the network device via a second interface that is different from the first interface.

In a second implementation, alone or in combination with the first implementation, process 300 includes performing the extended holdover procedure based on the clock signal.

In a third implementation, alone or in combination with one or more of the first and second implementations, the device comprises a global navigation satellite system (GNSS) receiver.

In a fourth implementation, alone or in combination with one or more of the first through third implementations, process 300 includes determining that a parameter of the first signal satisfies a threshold, and terminating the providing of the second signal and the third signal based on the parameter of the first signal satisfying the threshold.

In a fifth implementation, alone or in combination with one or more of the first through fourth implementations, process 300 includes receiving the clock signal based on terminating the transmission of the second signal and the third signal.

In a sixth implementation, alone or in combination with one or more of the first through fifth implementations, the clock signal is received from the network device.

Although FIG. 3 shows example blocks of process 300, in some implementations, process 300 includes additional blocks, fewer blocks, different blocks, or differently arranged blocks than those depicted in FIG. 3. Additionally, or alternatively, two or more of the blocks of process 300 may be performed in parallel.

Figure 4:
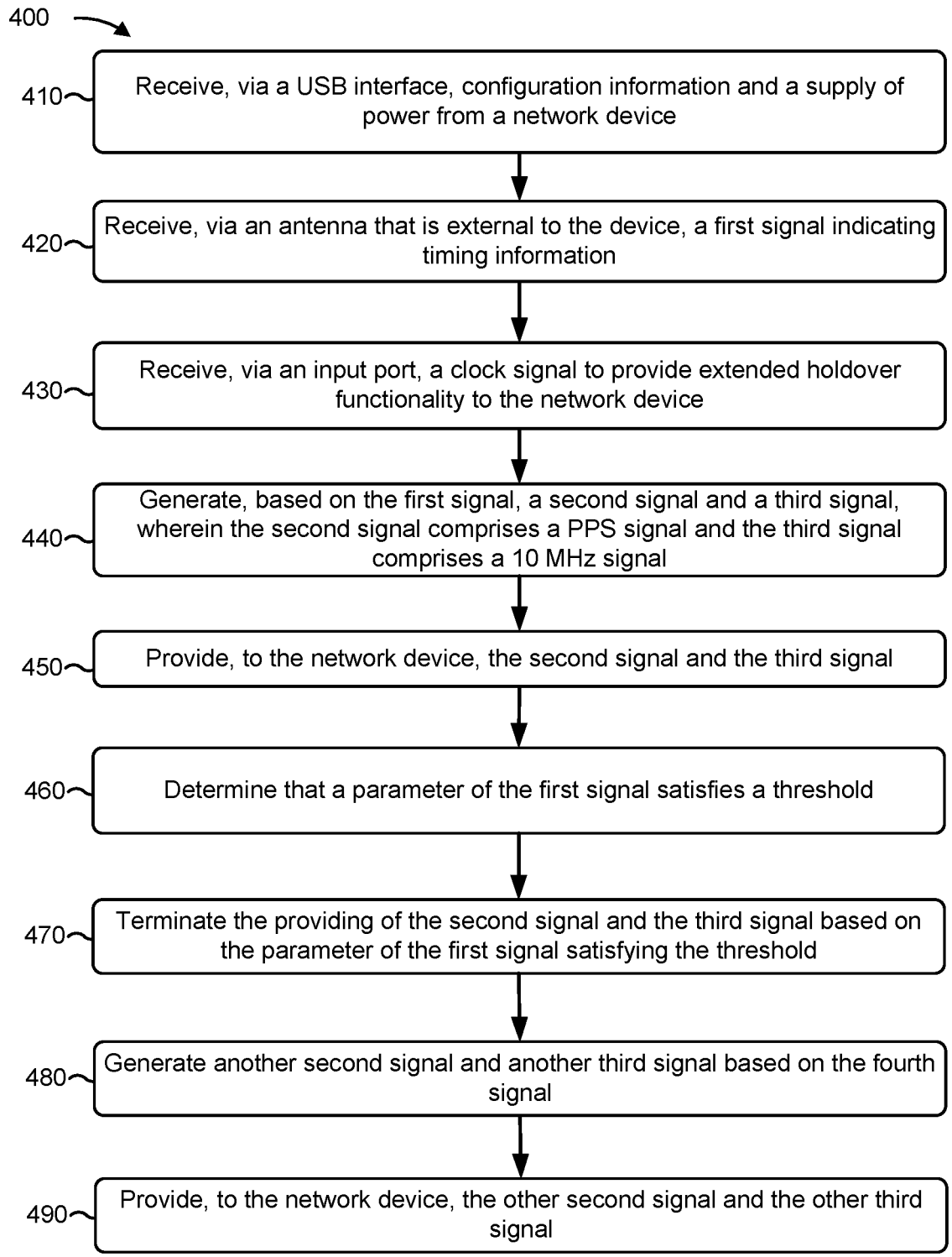

FIG. 4 is a flowchart of an example process 400 associated with systems and methods for providing a GNSS capability to a time sensitive network device. In some implementations, one or more process blocks of FIG. 4 are performed by a GNSS receiver (e.g., GNSS receiver 130). In some implementations, one or more process blocks of FIG. 4 are performed by another device or a group of devices separate from or including the device, such as a network device (e.g., network device 115). Additionally, or alternatively, one or more process blocks of FIG. 4 may be performed by one or more components of device 200, such as processor 220, memory 230, input component 240, output component 250, and/or communication component 260.

As shown in FIG. 4, process 400 may include receiving, via a USB interface, configuration information and a supply of power from a network device (block 410). For example, the device may receive, via a USB interface, configuration information and a supply of power from a network device, as described above.

As further shown in FIG. 4, process 400 may include receiving, via an antenna that is external to the device, a first signal indicating timing information (block 420). For example, the device may receive, via an antenna that is external to the device, a first signal indicating timing information, as described above.

As further shown in FIG. 4, process 400 may include receiving, via an input port of the device, a clock signal to provide an extended holdover functionality to the network device (block 430). For example, the device may receive, via an input port of the device, a clock signal to provide an extended holdover functionality to the network device.

As further shown in FIG. 4, process 400 may include generating, based on the first signal, a second signal and a third signal, wherein the second signal comprises a one pulse per second signal and the third signal comprises a ten-megahertz signal (block 440). For example, the device may generate, based on the first signal, a second signal and a third signal, wherein the second signal comprises a one pulse per second signal and the third signal comprises a ten-megahertz signal, as described above.

As further shown in FIG. 4, process 400 may include providing, to the network device, the second signal and the third signal (block 450). For example, the device may provide, to the network device, the second signal and the third signal, as described above.

As further shown in FIG. 4, process 400 may include determining that a parameter of the first signal satisfies a threshold (block 460). For example, the device may determine that a parameter of the first signal satisfies a threshold, as described above.

As further shown in FIG. 4, process 400 may include terminating the providing of the second signal and the third signal based on the parameter of the first signal satisfying the threshold (block 470). For example, the device may terminate the providing of the second signal and the third signal based on the parameter of the first signal satisfying the threshold, as described above.

As further shown in FIG. 4, process 400 may include generating another second signal and another third signal based on the fourth signal (block 480). For example, the device may generate another second signal and another third signal based on the fourth signal, as described above.

As further shown in FIG. 4, process 400 may include providing, to the network device, the other second signal and the other third signal (block 490). For example, the device may provide, to the network device, the other second signal and the other third signal, as described above.

Process 400 may include additional implementations, such as any single implementation or any combination of implementations described below and/or in connection with one or more other processes described elsewhere herein.

In a first implementation, the second signal is provided to the network device via a first interface and the third signal is provided to the network device via a second interface that is different from the first interface.

In a second implementation, alone or in combination with the first implementation, the device comprises a GNSS receiver.

In a third implementation, alone or in combination with one or more of the first and second implementations, process 400 includes receiving the clock signal based on terminating the transmission of the second signal and the third signal.

In a fourth implementation, alone or in combination with one or more of the first through third implementations, the clock signal is received from the network device.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   providing, by a first device and via a universal serial bus (USB) interface, configuration information and a supply of power to a second device;
   obtaining, by the first device and from the second device, a first signal and a second signal,
      wherein the first signal and the second signal are generated based on a third signal obtained via an antenna, and
      wherein the first signal comprises a first frequency signal and the second signal comprises a second frequency signal; and
   providing, by the first device, a fourth signal, wherein the fourth signal comprises a clock signal that enables the second device to perform an extended holdover functionality to the first device.

2. The method of claim 1, wherein the configuration information indicates one or more of:
   a length of a cable connecting a dongle and the first device,
   a length of a cable connecting a dongle and the antenna, or
   data associated with modifying a firmware of the first device.

3. The method of claim 1, wherein the second device is a global navigation satellite system (GNSS) receiver.

4. The method of claim 1, wherein the third signal is a global navigation satellite system (GNSS) signal.

5. The method of claim 1, further comprising:
   obtaining a one pulse per second signal.

6. The method of claim 1, wherein the second signal enables the first device to track phase or frequency.

7. The method of claim 1, further comprising:
   performing the extended holdover functionality based on a quality of the third signal.

8. A first device, comprising:
   one or more memories; and
   one or more processors to:
      provide, via a universal serial bus (USB) interface, configuration information and a supply of power to a second device;
      obtain, from the second device, a first signal and a second signal,
         wherein the first signal and the second signal are generated based on a third signal obtained via an antenna, and
         wherein the first signal comprises a first frequency signal and the second signal comprises a second frequency signal; and
      provide a fourth signal, wherein the fourth signal comprises a clock signal that enables the second device to perform an extended holdover functionality to the first device.

9. The first device of claim 8, wherein the configuration information indicates one or more of:
   a length of a cable connecting a dongle and the first device,
   a length of a cable connecting a dongle and the antenna, or
   data associated with modifying a firmware of the first device.

10. The first device of claim 8, wherein the second device is a global navigation satellite system (GNSS) receiver.

11. The first device of claim 8, wherein the third signal is a global navigation satellite system (GNSS) signal.

12. The first device of claim 8, wherein the one or more processors are further to:
   obtain a one pulse per second signal.

13. The first device of claim 8, wherein the second signal enables the first device to track phase or frequency.

14. The first device of claim 8, wherein the one or more processors are further to:
   perform the extended holdover functionality based on a quality of the third signal.

15. A non-transitory computer-readable medium storing a set of instructions, the set of instructions comprising:
   one or more instructions that, when executed by one or more processors of a first device, cause the first device to:
      provide, via a universal serial bus (USB) interface, configuration information and a supply of power to a second device;
      obtain, from the second device, a first signal and a second signal,
         wherein the first signal and the second signal are generated based on a third signal obtained via an antenna, and
         wherein the first signal comprises a first frequency signal and the second signal comprises a second frequency signal; and
      provide a fourth signal, wherein the fourth signal comprises a clock signal that enables the second device to perform an extended holdover functionality to the first device.

16. The non-transitory computer-readable medium of claim 15, wherein the configuration information indicates one or more of:
   a length of a cable connecting a dongle and the first device,
   a length of a cable connecting a dongle and the antenna, or
   data associated with modifying a firmware of the first device.

17. The non-transitory computer-readable medium of claim 15, wherein the second device is a global navigation satellite system (GNSS) receiver.

18. The non-transitory computer-readable medium of claim 15, wherein the third signal is a global navigation satellite system (GNSS) signal.

19. The non-transitory computer-readable medium of claim 15, wherein the second signal enables the first device to track phase or frequency.

20. The non-transitory computer-readable medium of claim 15, wherein the one or more instructions further cause the first device to:

perform the extended holdover functionality based on a quality of the third signal.

* * * * *